US006720740B2

(12) United States Patent
Toyama (10) Patent No.: US 6,720,740 B2
(45) Date of Patent: Apr. 13, 2004

(54) DISCHARGE LAMP BALLAST CIRCUIT HAVING SNUBBER CIRCUIT

(75) Inventor: Koichi Toyama, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/216,826

(22) Filed: Aug. 13, 2002

(65) Prior Publication Data

US 2003/0034744 A1 Feb. 20, 2003

(30) Foreign Application Priority Data

Aug. 20, 2001 (JP) ........................................ 2001-249343

(51) Int. Cl.[7] .............................................. H05B 37/02
(52) U.S. Cl. ....................................... 315/247; 315/307
(58) Field of Search ................................ 315/291, 224, 315/225, 307, 247, 244, 219, 276

(56) References Cited

U.S. PATENT DOCUMENTS 5,583,398 A * 12/1996 Dellamano et al. ......... 315/247
5,751,121 A * 5/1998 Toyama et al. ............. 315/307
5,880,563 A * 3/1999 Toyama et al. ............. 315/225
5,912,712 A * 6/1999 Toyama ...................... 315/307

FOREIGN PATENT DOCUMENTS

JP          A-9-223590          8/1997

* cited by examiner

Primary Examiner—Wilson Lee
(74) Attorney, Agent, or Firm—Posz & Bethards, PLC (57) ABSTRACT

A discharge lamp ballast circuit has a snubber circuit to perform a soft switching when the MOS transistor is turned off. The snubber circuit has, for example, a capacitor that resonates with a reactance of the fly-back transformer and enables a zero voltage switching. Before a breakdown of a discharge lamp, a control circuit drives the MOS transistor in a non-zero voltage switching manner by turning on the MOS transistor just after a peak voltage. The non-zero voltage switching increases an output voltage of the fly-back transformer. After the breakdown of the discharge lamp, the control circuit turns on the MOS transistor in the zero voltage switching manner to perform the soft switching. As a result, it is possible to reduce switching loss during a lighting of the discharge lamp and to supply sufficient voltage in the lighting preparation period.

11 Claims, 12 Drawing Sheets

START/BREAKDOWN

DISCHARGE LAMP BALLAST CIRCUIT HAVING SNUBBER CIRCUIT

CROSS REFERENCE TO RELATED APPLICATION

This application is based on Japanese Patent Application No. 2001-249343 filed on Aug. 20, 2001 the contents of which are incorporated herein by reference.

BACKGROUND OF THE INVENTION

1. Field of the Invention

The present invention relates to a discharge lamp ballast circuit for driving a high-tension discharge lamp, and is preferable for a vehicular headlamp using a discharge lamp.

2. Description of Related Art

Conventionally, a ballast circuit for a discharge lamp drives the discharge lamp to initiate an arc and to maintain the arc during a lighting period. In order to drive the discharge lamp efficiently, the ballast circuit controls power applied to the discharge lamp. For example, the ballast circuit has a DC/DC converter circuit to generate a high-tension voltage for driving the discharge lamp, and controls the DC/DC converter circuit to vary an output voltage. In order to reduce a switching loss of the DC/DC converter circuit, it is preferable to perform a soft switching.

JP-A-9-84343 discloses the ballast circuit capable of performing the soft switching. A capacitor connected in parallel with a switching device provides a snubber circuit for performing the soft switching when turning off the switching device.

SUMMARY OF THE INVENTION

According to the conventional ballast circuit the snubber circuit may effectively perform the soft switching when turning off the switching device. On the contrary, when turning on the switching device, the ballast circuit adjusts timing of turning on. However, waveform of the voltage and the current may vary in accordance with values of the inductance and capacitance of the circuit. For example, if the switching device is a MOS transistor that has a parasitic diode between the source and the drain, a resonance current may flow through the parasitic diode when the voltage on the MOS transistor reaches to a negative voltage due to a resonance and the resonance current may vary. The resonance current may cause a loss. Further, it is difficult to reduce the loss over before and after an initiation of the arc on the discharge lamp.

It is an object of the present invention to provide a discharge lamp ballast circuit which is capable of reducing loss.

It is an object of the present invention to provide a discharge lamp ballast circuit which is capable of reducing loss and supplying a sufficient voltage before the discharge lamp makes a breakdown.

It is still another object of the present invention to provide a discharge lamp ballast circuit that is capable of reducing a switching loss of the DC/DC converter circuit and has the DC/DC converter circuit easily up-converts before the breakdown of the discharge lamp.

According to a first aspect of the present invention, a discharge lamp ballast circuit has a capacitor that generates a resonance with a leakage reactor of a fly-back transformer of a DC/DC converter. The discharge lamp ballast circuit further has a control circuit for controlling a switching device of the DC/DC converter circuit in a PFM manner so that the switching device is driven in a non-zero voltage switching or a non-zero current switching during a lighting preparation period of the discharge lamp, and so that the switching device is driven in a zero voltage switching or a zero current switching after the lighting preparation period. The non-zero voltage switching or the non-zero current switching enables to increase the output voltage of the DC/DC converter circuit for satisfying a required voltage for initiating the discharge lamp. The resonance generated by the capacitor and the leakage reactor enables the zero voltage switching or the zero current switching to reduce switching loss. The capacitor or the leakage reactor provides a snubber circuit for the switching device of the DC/DC converter circuit. Therefore, it is possible to perform a soft switching by a snubber switching operation.

As a result, it is possible to supply sufficient voltage and to reduce switching loss.

The capacitor may be connected in parallel with the switching device or the primary coil of the fly-back transformer. In those cases, the capacitor performs a C-snubber switching operation. The capacitor may be connected in parallel with the switching device and the secondary coil of the fly-back transformer. In this case, the leakage reactor may perform an L-snubber switching operation. The switching device may be a semi-conductor switching device such as a MOS transistor.

The non-zero voltage switching may be performed in accordance with the voltage on the primary coil of the fly-back transformer. The switching device may be turned on after the voltage reaches to a peak value and before the voltage reaches to 0V or below 0V.

A switching frequency is variable due to the PFM control. The switching frequency takes higher value during the lighting preparation period than after the lighting preparation period. For example, the switching frequency is increased by the non-zero voltage switching or the non-zero current switching which are shortening an off or on period of the switching device. For example, the control circuit drives the switching device by a switching frequency when performing the zero voltage switching. The control circuit further drives the switching device by a higher switching frequency when performing the non-zero voltage switching in comparison with the switching frequency in the zero voltage switching. The higher switching frequency may be obtained by shortening an off period of the switching device. The off period is shortened by turning on the switching device earlier, for example, in a range after a voltage on the primary coil reaches to a peak value and before the voltage on the primary coil reaches to zero or below zero.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

A first embodiment which is a vehicular discharge lamp ballast circuit implementing the present invention will be described with reference to the drawings.

Figure 1:
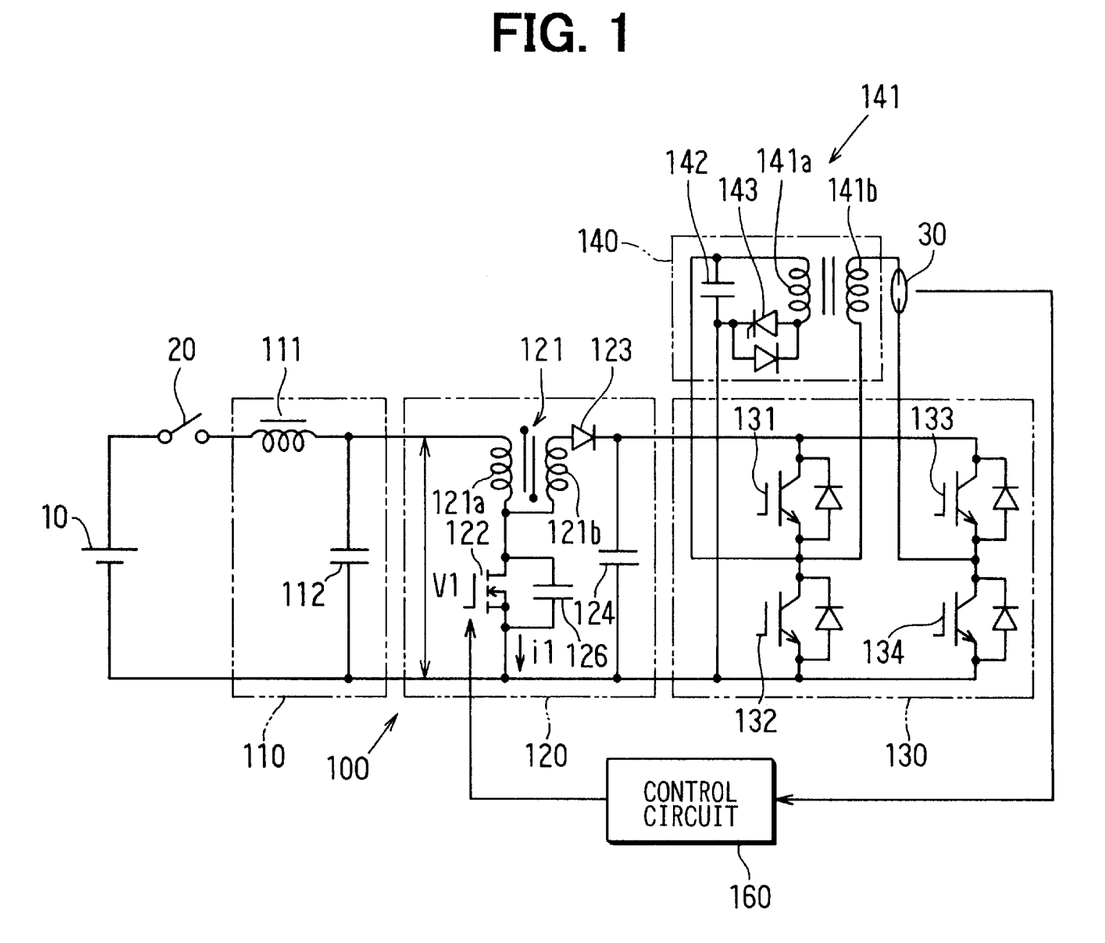
FIG. 1 is a schematic diagram showing a discharge lamp ballast circuit according to a first embodiment of the present invention.

Referring to FIG. 1, the discharge lamp ballast circuit 100 is powered by a battery 10 mounted on a vehicle. The circuit 100 has a filter circuit 110, a DC/DC converter circuit 120, an inverter circuit 130, a starter circuit 140 and a control circuit 160. The discharge lamp device 100 is arranged to up-convert DC voltage from the battery 10 by the DC/DC converter circuit 120, and to invert the up-converted DC voltage into an AC voltage by the inverter circuit 130.

The lamp 30 is mounted on a headlamp assembly for a vehicle, and is a discharge lamp such as a metal halide lamp.

The filter circuit 110 includes a coil 111 and a capacitor 112, and is disposed for reducing a noise.

The DC/DC converter circuit 120 includes a fly-back transformer 121 that has a primary coil 121a connected in series with the battery 10 and a secondary coil 121b arranged to supply output power to the lamp 30. A MOS transistor 122 (field effect type transistor) as a semi-conductor switching device is connected in series to the primary coil 121a. A rectifier diode 123 connected in series to the secondary coil 121b. A smoothing capacitor 124 is connected between a cathode of the diode 123 and a ground line. The DC/DC converter circuit 120 outputs an up-converted voltage. That is, in the DC/DC converter circuit 120, the primary coil 121a accumulates energy according to a primary current i1 that flows through the primary coil 121a when the MOS transistor 122 is turned on, and the primary coil 121a supplies its energy to the secondary coil 121b when the MOS transistor 122 is turned off. Then, by repeating such the operation, a high-tension voltage is outputted from a connection point between the diode 123 and the smoothing capacitor 124. Here, the fly-back transformer 121 is arranged to electrically conduct the primary coil 121a and the secondary coil 121b as shown in FIG. 1. In the DC/DC converter circuit 120, a capacitor 126 is disposed in parallel with the MOS transistor 122. The capacitor 126 is a device for providing a snubber circuit. The capacitance of the capacitor 126 is selected so that a leakage reactor (not shown in the drawing) and the capacitor 126 generate resonance.

The inverter circuit 130 includes switching devices (e.g., MOS transistors of IGBTs) 131–134. The switching devices are arranged in an H-bridge fashion, and are disposed to drive the lamp 30 by an alternating current.

The starter circuit 140 includes a transformer having a primary coil 141a and a secondary coil 141b, a capacitor 142, and a thyristor 143 that is a unidirectional semi-conductor switching device. The starter circuit 140 generates high-tension pulses to start a lighting of the lamp 30 by causing a breakdown between electrodes of the lamp 30. In an operation, when the capacitor 142 is charged to a predetermined level, the thyristor 143 is turned on, and the capacitor 142 discharges to the primary coil 141a. Then the thyristor 143 turns off. As a result, a high-tension pulse (e.g., 25 kV) is generated on the secondary coil 141b and is applied to the lamp 30. As a result, the lamp 30 makes a breakdown between electrodes and initiates an arc.

The control circuit 160 controls the MOS transistor 122 by a PFM (Pulse Frequency Modulation) method.

Figure 2:
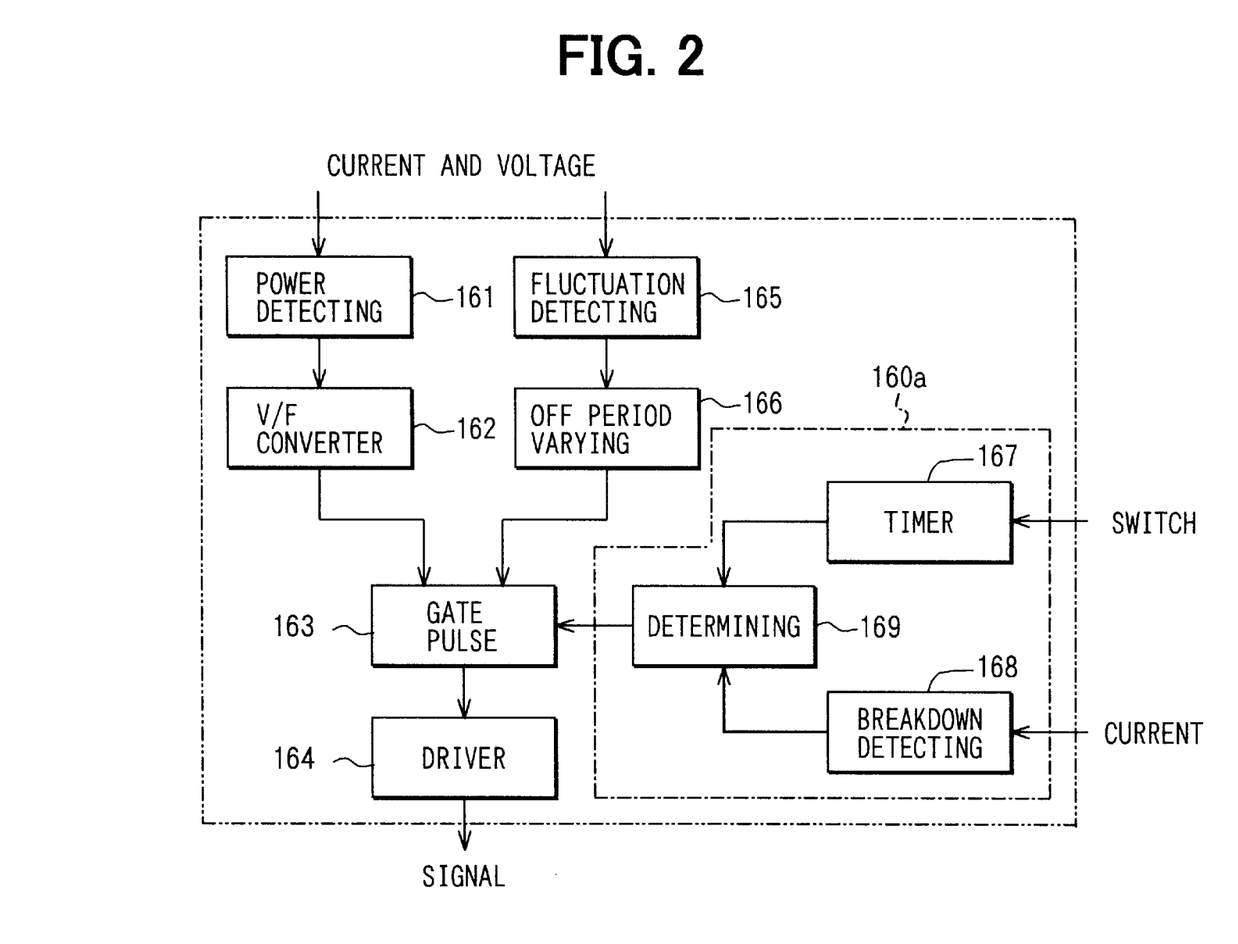
FIG. 2 is a block diagram showing a control circuit according to the first embodiment of the present invention.

Referring to FIG. 2, the control circuit 160 has a power detecting circuit 161 for detecting a lamp power based on signals corresponding to the lamp voltage and the lamp current. A V/F converter circuit 162 for converting the voltage indicative of the lamp power outputted from the power detecting circuit 161 into a frequency signal is coupled to the power detecting circuit 161. A gate pulse generating circuit 163 for generating gate pulse applied to the gate of the MOS transistor 122 is coupled to the V/F converter circuit 162. A driver circuit 164 for applying the gate pulse on the gate of the MOS transistor 122 is coupled to the gate pulse generating circuit 163.

The control circuit 160 further has a power fluctuation detecting circuit 165 for detecting a fluctuation of the lamp power based on the lamp voltage and the lamp current. An off period varying circuit 166 for outputting signals for extending an off period of the MOS transistor 122 when the fluctuation of the lamp power is detected by the power fluctuation detecting circuit 165. The gate pulse generating circuit 163 generates a gate pulse for extending the off period of the MOS transistor 122 in response to the signal outputted from the V/F converter circuit 162 and the signal outputted from the off period varying circuit 166.

The control circuit 160 has an off period shortening circuit 160a for shortening the off period of the MOS transistor 122 during a lighting preparation period. The lighting preparation period is a period before the lamp 30 makes a breakdown. That is, the lighting preparation period may be a period from a turning on of the lighting switch 20 to a breakdown of the lamp 30. The off period shortening circuit 160a has a timer circuit 167 for inputting a signal from the lighting switch 20 and for outputting a signal having a predetermined duration that is indicative of a lighting preparation period in response to the turning on of the lighting switch 20. A breakdown detecting circuit 168 for inputting a signal corresponding to the lamp current and for detecting whether the lamp 30 is lit or not based on the lamp current. A lighting preparation period determining circuit 169 for determining whether it is the lighting preparation period or not based on the signal outputted from the timer circuit 167 or the lighting detecting circuit 168.

For example, the lighting preparation period determining circuit 167 starts to output a signal indicative of the lighting preparation period in response to the signal from the timer circuit 167 and continues to output the signal until the breakdown detecting circuit 168 detects a start of lighting that is the breakdown between electrodes of the lamp 30. The gate pulse generating circuit 163 generates a gate pulse that defines a shortened off period of the MOS transistor 122 based on the signal from the lighting preparation period determining circuit 169.

Figure 3:
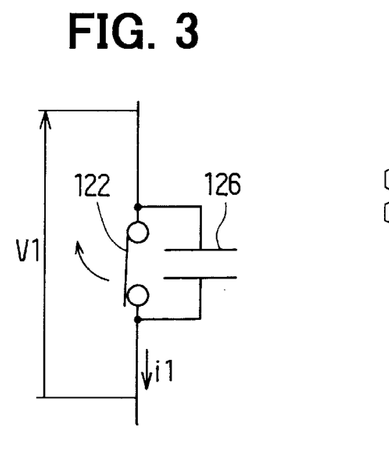
FIG. 3 is a schematic view of a snubber circuit.
Figure 4:
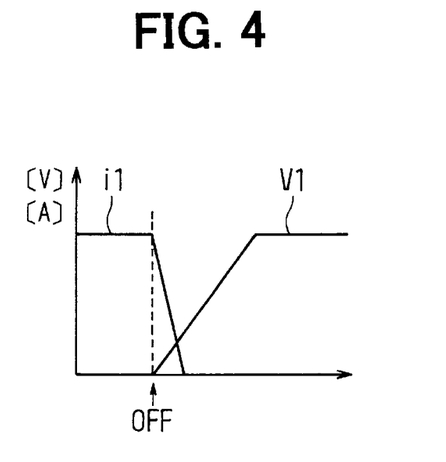
FIG. 4 is a time chart showing waveforms of a voltage V1 and a current i1 indicated in FIG. 3.

Referring to FIGS. 3 and 4, an operation of the snubber circuit is explained. FIG. 3 shows a schematic diagram of the MOS transistor 122 and the capacitor 126. FIG. 4 shows waveforms of the voltage V1 and the current i1 indicated in FIG. 3. The capacitor 126 performs the soft switching by delaying a response of the voltage V1 when the switch 122 is turned off. When the switch 122 is turned off from a state shown in FIG. 3, the capacitor 126 is gradually charged and delays an increase of the voltage V1 as shown in FIG. 4. Therefore, the capacitor 126 generates a low dV/dt after turning off the switch 122. This kind of snubber switching operation is called as a C-snubber switching operation. It is possible to reduce the switching loss by reducing an overlap between the current waveform and the voltage waveform as shown in FIG. 4 since dV/dt is reduced in comparison to the case in which no capacitor is connected (hard switching).

Figure 5:
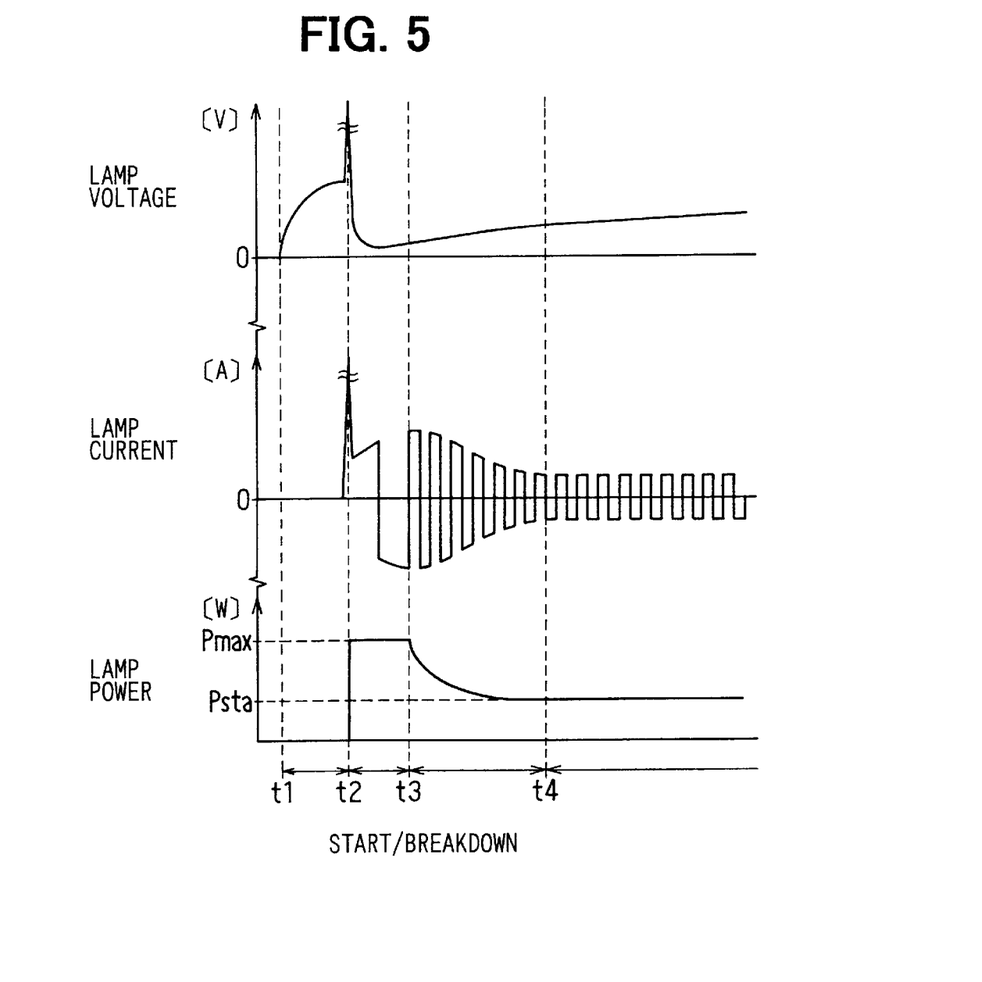
FIG. 5 is a time chart showing waveforms of a lamp voltage, a lamp current and a lamp power according to the first embodiment of the present invention.

The control circuit 160 controls the MOS transistor 122 so that the lamp power is controlled as shown in FIG. 5. The control circuit 160 inputs signals that is indicative of operational condition of the lamp 30 such as the lamp power, the lamp voltage, and the lamp current from detecting circuit (not shown).

In case of an operation illustrated in FIG. 5, the lighting switch 20 is turned on at t1. The lighting preparation period is indicated between t1 and t2. During the lighting preparation period, the DC/DC converter circuit 120 supplies a relatively high up-converted voltage (300–500V) compared with a voltage in a stable condition. This helps to start an arc discharge that is more stable than a glow discharge. In this embodiment, the DC/DC converter circuit 120 supplies 400V in the lighting preparation period.

The DC/DC converter circuit 120 outputs and supplies an up-converted voltage to the capacitor 142 of the starter circuit 140 via the inverter circuit 130, and charges the capacitor 142. Then, the thyristor 143 is turned on to discharge the capacitor 142 through the primary coil 141a. The transformer 141 generates a pulse on the secondary coil 141b, and supplies it to the lamp 30. As a result, the lamp 30 makes a breakdown.

The lamp 30 makes a breakdown at t2, that is, the lamp 30 begins lighting. After the breakdown, the transistors 131–134 are alternately turned on and off in a diagonal relationship (i.e., the pair of the transistors 131 and 134 and the pair of the transistors 132 and 133 are alternately turned on and off). Therefore, polarities of the voltage applied on the lamp 30 are alternately inverted.

In a period between t2 and t3, the control circuit 160 supplies a maximum power Pmax (e.g. 65 W) because of an instable glow discharge of the lamp 30. Then, the control circuit 160 gradually decreases the lamp power from t3 to t4, which is called as a transitional period. The lamp 30 gradually shifts from the glow discharge to a stable arc discharge while the transitional period. The control circuit 160 supplies a stable power Psta (e.g. 35 W) that is a rated power of the lamp 30 after completion of the transitional period. As described above, the lamp voltage is increased to make a breakdown after turning on the lighting switch 20. Then, the lamp power is adjusted to a maximum power during a predetermined period that is a period for stabilizing a discharge. Then, the lamp power is gradually decreased to a steady power during a transitional period. After the transitional period, the lamp power is maintained in the steady power for keeping the lamp 30 in a stable lighting condition.

In this embodiment, the control circuit 160 controls the MOS transistor 122 in the PFM manner so that the lamp power coincides with a desired value. In order to executes the PFM control, the MOS transistor 122 is driven by the following control manner.

Figure 6:
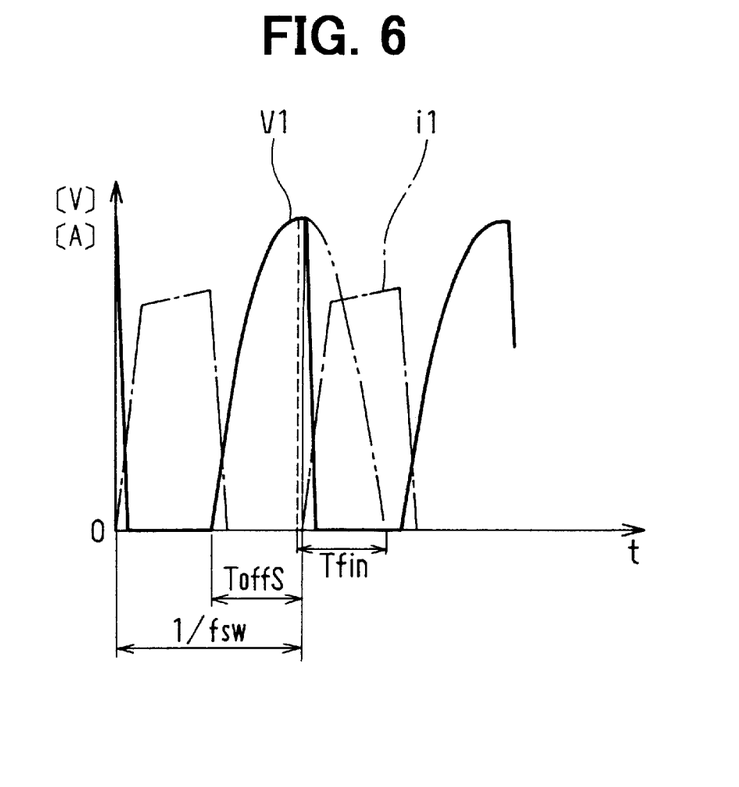
FIG. 6 is a time chart showing waveforms of a voltage V1 and a current i1 indicated in FIG. 1.

In the lighting preparation period, the control circuit 160 performs a non-zero voltage switching when turning on the MOS transistor 122 as shown in FIG. 6. The snubber circuit performs the snubber switching when turning off the MOS transistor 122a. In the lighting preparation period, the DC/DC converter circuit 120 is required to output a higher voltage in order to shift the lamp 30 quickly from an instable glow discharge condition to a stable arc discharge condition. In this embodiment, the control circuit 160 drives the MOS transistor 122 based on a shortened off period ToffS during the lighting preparation period. The shortened off period ToffS is shorter than an off period ToffL for driving the MOS transistor 122 after the start of lighting.

In this embodiment, the gate pulse generating circuit 163 shortens the gate pulse in response to the signal from the off period shortening circuit 160a. The off period shortening circuit 160a detects the lighting preparation period and instructs to shorten the gate pulse when the lighting preparation period is detected. The shortened off period ToffS obtains a large cut-off current on the primary coil 121a as shown in FIG. 6, because a residual magnetic energy in the fly-back transformer 121 is increased. Therefore, it is possible to increase an output voltage of the DC/DC converter circuit 120. The shortened off period ToffS is set so that the end of the off period is located in a predetermined range. In this embodiment, the predetermined range Tfin is defined based on the voltage V1. The predetermined range Tfin begins when the voltage V1 reaches to a peak value and ends when the voltage V1 reaches to 0V. Therefore, the MOS transistor 122 is turned off after the voltage V1 reaches to the peak value and before the voltage V1 reaches to 0V.

Since an insulating condition is maintained between the electrodes of the lamp 30 before start of lighting, the DC/DC converter circuit 120 outputs no power, and it is possible to avoid power loss even if the non-zero voltage switching is performed during the lighting preparation period.

Figure 7:
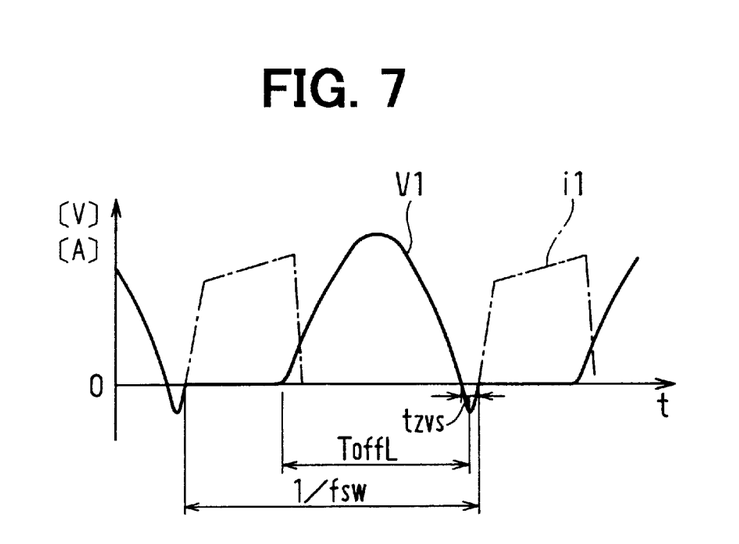
FIG. 7 is a time chart showing waveforms of a voltage V1 and a current i1 indicated in FIG. 1.

After the breakdown, the control circuit 160 performs a zero voltage switching when turning on the MOS transistor 122 as shown in FIG. 7. The snubber circuit performs the snubber switching when turning off the MOS transistor 122 so that the turn off loss is reduced. Therefore, the MOS transistor 122 is driven in the soft switching manner at both of turning on and off.

In order to enable the zero voltage switching, the capacitance Cr of the capacitor 126 and the leakage reactor of the fly-back transformer 121 are set in predetermined value. In this embodiment, the capacitor 126 and the leakage reactor of the fly-back transformer 121 generate a resonance.

Referring to FIG. 7, in the PFM control, although the switching frequency fsw for switching the MOS transistor 122 varies, an off period ToffL of the MOS transistor 122 is constant (fixed) in a switching period (1/fsw). When the off period ToffL is longer enough, the voltage V1 is lowered below 0V by the resonance. Therefore, a current flows through a parasitic diode of the MOS transistor 122. At this time, the control circuit 160 turns on the MOS transistor 122 to perform the zero voltage switching. It is possible to reduce a turn on loss by the zero voltage switching.

Figure 8:
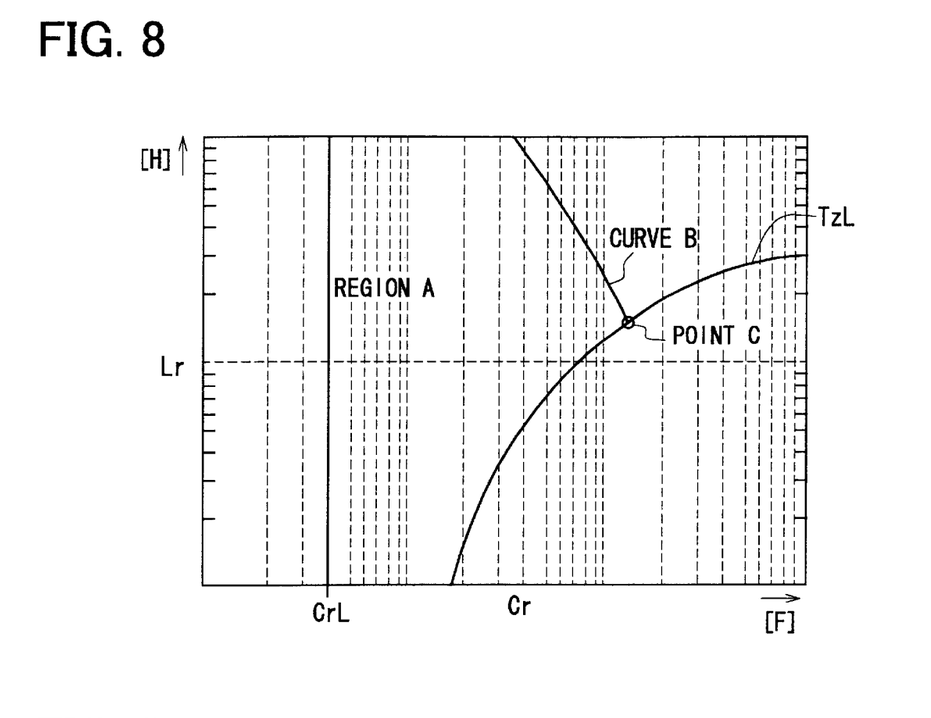
FIG. 8 is a graph showing a relationship between an inductance Lr of a leakage reactor and a capacitance Cr of a capacitor as shown in FIG. 1 according to the first embodiment of the present invention.

In order to perform the zero voltage switching described above, an inductance Lr of the leakage reactor of the fly-back transformer 121 and a capacitance Cr of the capacitor 126 are set in specific values. FIG. 8 is a graph showing a relationship between the inductance Lr and the capacitance Cr.

First, in order to perform the zero voltage switching that is the soft switching, the inductance Lr and the capacitance Cr should take values within a region A as shown in FIG. 8. The region A is defined by a lower limit CrL of the capacitance Cr and a lower limit TzL of a diode conducting period tzvs. The diode conducting period tzvs is a period in which a current flows through the parasitic diode of the MOS transistor 122 as shown in FIG. 7. The lower limit CrL is defined based on a relationship between the capacitor 126 and a parasitic capacitor of the MOS transistor 122. In order to turn on the MOS transistor 122 in the zero voltage switching manner, the diode conducting period tzvs is needed to keep a certain length. However, if the diode conducting period tzvs is too long, it causes loss. Therefore, a minimum period which enables to turn on the MOS transistor 122 is set as the lower limit TzL of the diode conducting period tzvs. When setting the lower limit TzL, variations of circuit parameters of the discharge lamp ballast circuit are taken into consideration. In FIG. 8, a curved line TzL indicates the values of the inductance Lr and the capacitance Cr that are capable of generating the lower limit TzL of the diode conducting period.

In this embodiment, although the switching frequency fsw is variable to perform the PFM control, in order to drive the discharge lamp adequately, there is an optimum switching frequency fsw0 (constant). The inductance Lr and the capacitance Cr are set to obtain the optimum switching frequency fsw0. In FIG. 8, the optimum switching frequency fsw0 can be obtained on a curve B.

Loss of the DC/DC converter circuit 120 depends on the inductance Lr, and is decreased as the inductance Lr is decreased. Therefore, it is preferable to take a smaller inductance Lr.

According to the above study, if the inductance Lr and the capacitance Cr are set in a point C shown in FIG. 8, it is possible to perform the soft switching and to minimize the loss of the DC/DC converter circuit 120. As a result, the inductance Lr of the leakage reactor and the capacitance Cr of the capacitor 126 are set specific values so that the values satisfies a condition for enabling the zero voltage switching and for setting the switching frequency fsw of the PFM control into a predetermined constant frequency fsw0, and so that the inductance Lr of the leakage reactor is minimized under satisfying the condition.

As a result, the control circuit 160 performs the soft switching by the zero voltage switching when turning on the MOS transistor 122 after the breakdown of the discharge lamp 30, especially after completion of the transitional period. When turning off the MOS transistor 122, the C-snubber switching is performed.

Figure 9:
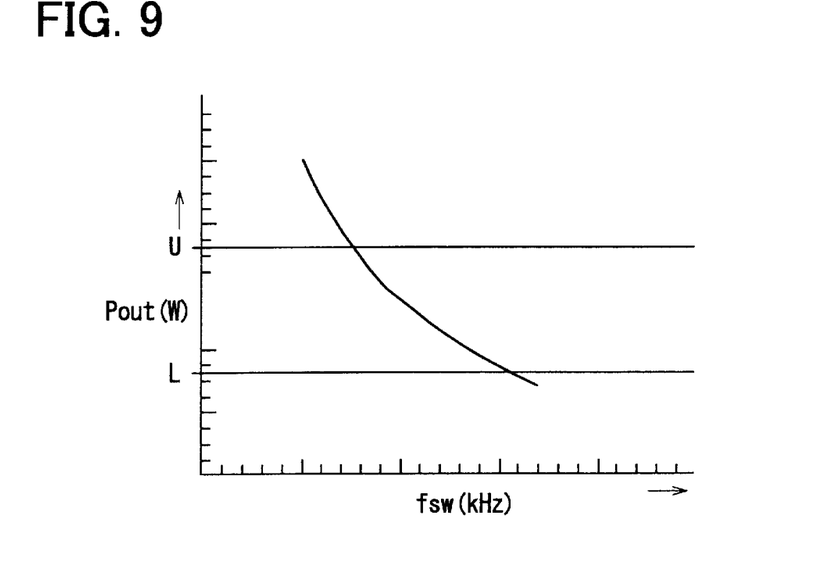
FIG. 9 is a graph showing a relationship between a switching frequency fsw and a lamp power Pout when performing a PFM control according to the first embodiment of the present invention.
Figure 10:
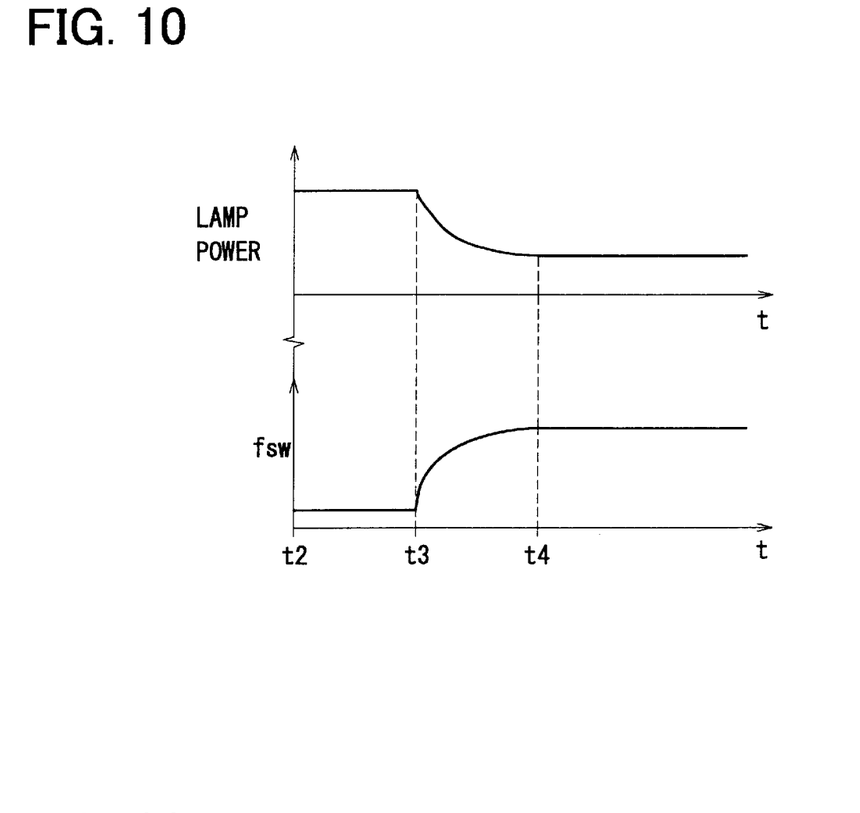
FIG. 10 is a time chart showing an optimum lamp power and an optimum switching frequency according to the first embodiment of the present invention.

In this embodiment, the switching frequency fsw is variable in accordance with a target value of the lamp power. Referring to FIG. 9, the output power Pout of the DC/DC converter circuit 120 varies according to the switching frequency fsw. The output power Pout should be variable from an lower limit L to an upper limit U as shown in FIG. 9. In order to control the lamp power as shown in FIG. 5, the switching frequency fsw is varied as shown in FIG. 10. FIG. 9 shows a characteristic using the inductance Lr and the capacitance Cr set based on the above-mentioned condition.

Figure 11:
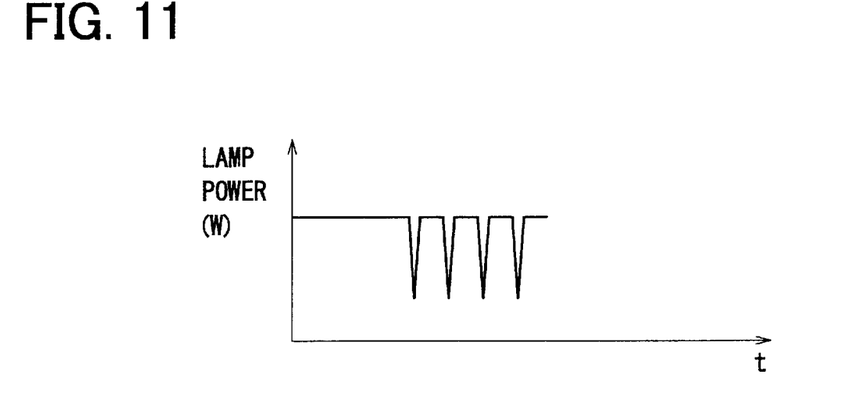
FIG. 11 is a time chart showing the lamp power according to the first embodiment of the present invention.

In this embodiment, the inverter circuit 130 inverts the lamp power periodically as shown in FIG. 5. Therefore, the lamp power instantaneously takes a low output condition as shown in FIG. 11. Due to the low output condition, the voltage V1 is delayed. Specifically, a timing on which the voltage V1 becomes equal to or lower than 0V is delayed. Therefore, if such the condition is not considered in the PFM control, the MOS transistor 122 can not turn on in the diode conducting period tzvs. In this embodiment, the power fluctuation detecting circuit 165 detects the instantaneous drop of the lamp power. The off period varying circuit 166 extends the off period ToffL in accordance with the fluctuation of the lamp power that is detected by the power fluctuation detecting circuit 165 and is indicative of the instantaneous drop of the lamp power. Therefore, it is possible to turn on the MOS transistor 122 in the diode conducting period tzvs.

As described above, the control circuit 160 drives the DC/DC converter circuit 120 by the PFM manner so as to obtain a predetermined power. The control circuit 160 drives the DC/DC converter circuit 120 by a relatively high frequency due to the non-zero voltage switching during the lighting preparation period as shown in FIG. 6. Then, the control circuit 160 drives the DC/DC converter circuit 120 by a relatively low frequency after the breakdown of the lamp 30. The switching frequency in the lighting preparation period is higher than that of the after breakdown. Therefore, it is possible to supply a higher voltage during the lighting preparation period. After the breakdown, the zero voltage switching performs as the soft switching, and reduces the turn on loss. The snubber circuit also performs as the soft switching when turning off the MOS transistor. As a result, the embodiment is capable of improving efficiencies and supplying desired voltage.

Figure 12:
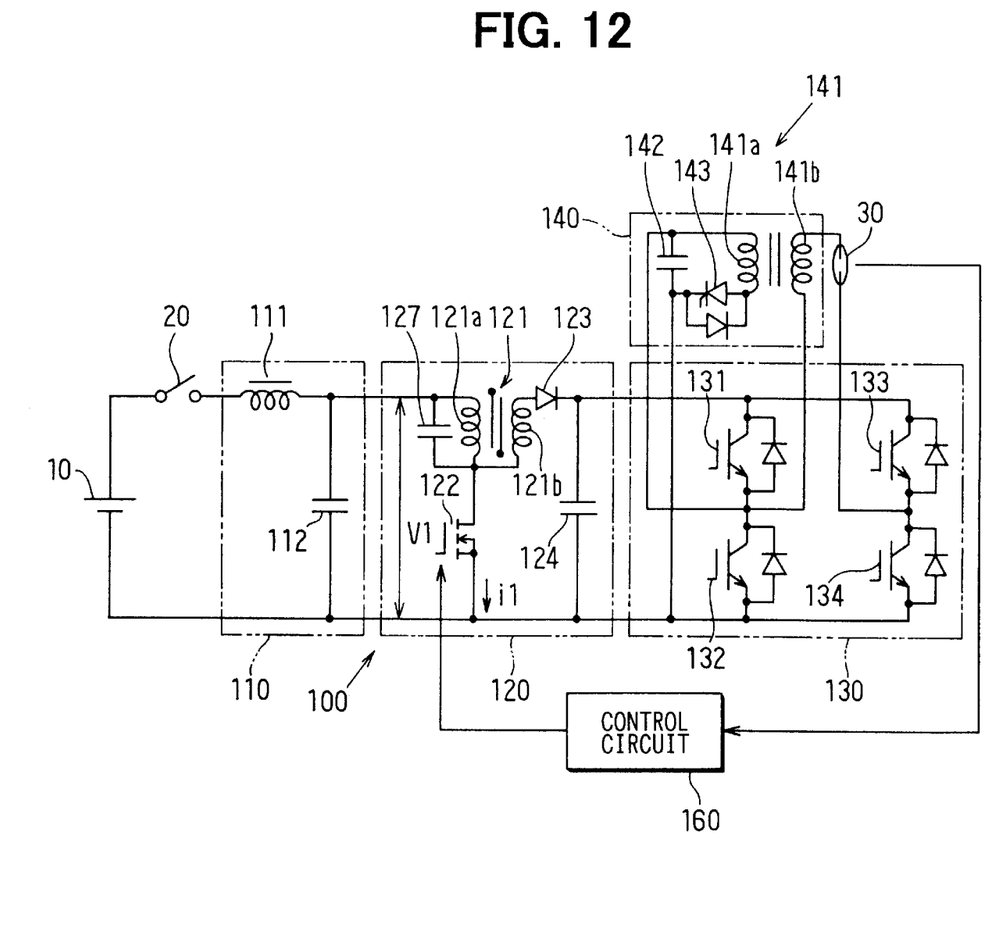
FIG. 12 is a schematic diagram according to a second embodiment of the present invention.

Referring to FIG. 12, in a second embodiment of the present invention, a capacitor 127 is connected in parallel with the primary coil 121a instead of the capacitor 126 in the first embodiment. The capacitor 127 has a capacitance that is set to generate a resonance with the leakage reactor of the fly-back transformer 121. According to the second embodiment, the same advantages as the first embodiment can be obtained.

Figure 13:
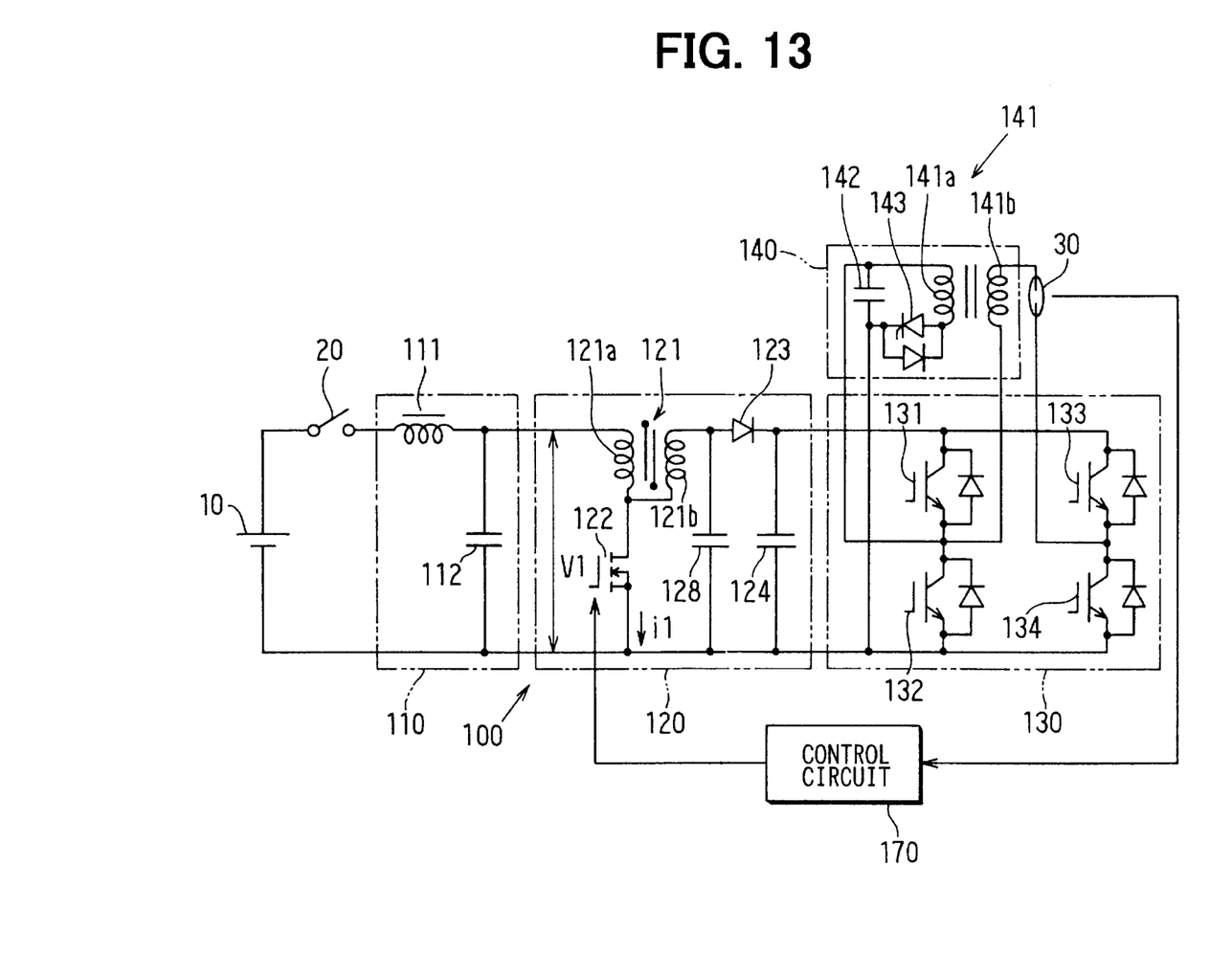
FIG. 13 is a schematic diagram according to a third embodiment of the present invention.

Referring to FIG. 13, in a third embodiment of the present invention, a capacitor 128 that has a terminal connected to a connection point between the secondary coil 121b and the diode 123 and another terminal connected to the ground line. The capacitor 128 is disposed instead of the capacitor 126 of the first embodiment.

Figure 14:
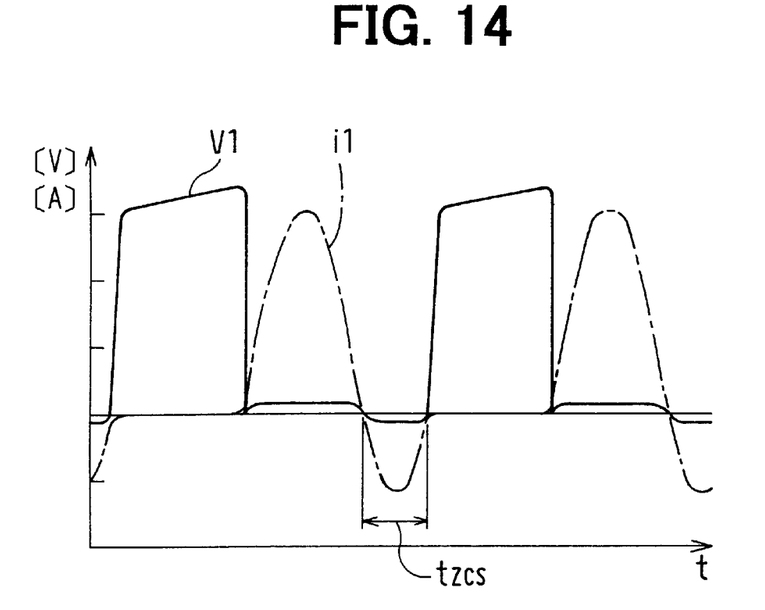
FIG. 14 is a time chart showing a voltage V1 and a current i1 indicated in FIG. 13.

Further, in this embodiment, the soft switching is performed by a zero current switching when turning off the MOS transistor 122. In this embodiment, the capacitor 128 and the leakage reactor of the fly-back transformer 121 generate a resonance, and obtain a diode conducting period tzcs as shown in FIG. 14. The control circuit 170 turns off the MOS transistor in the diode conducting period tzcs. The zero current switching is performed after completing the lighting preparation period. In the lighting preparation period, a non-zero current switching is performed to increase a switching frequency and to increase the output voltage of the DC/DC converter circuit 120. In the non-zero current switching, the MOS transistor 122 is turned off after the current i1 reaches to a peak value, and before the current i1 reaches to 0A or below 0A.

Figure 15:
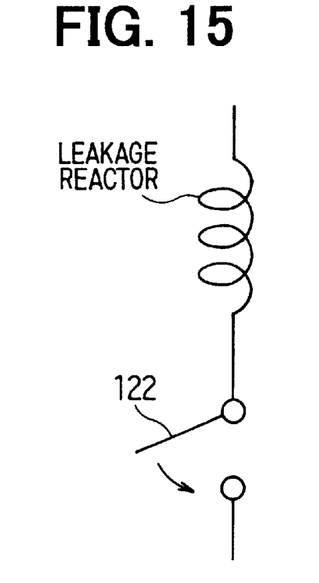
FIG. 15 is a schematic diagram showing a snubber circuit.
Figure 16:
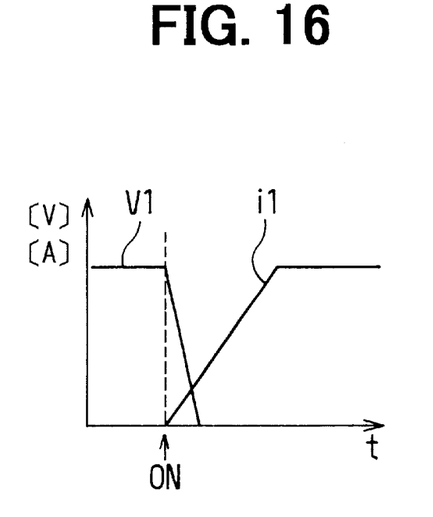
FIG. 16 is a time chart showing a voltage V1 and a current i1 indicated in FIG. 15.

When turning on the MOS transistor 122, the leakage reactor of the fly-back transformer 121 performs as a snubber circuit that performs an L-snubber switching. In the L-snubber switching operation, when turning on the MOS transistor 122 as shown in FIG. 15, the leakage reactor limits an increasing rate of the current i1 and delays the current i1 as shown in FIG. 16. Therefore, the switching loss can be reduced by the L-snubber switching operation.

Further, in the embodiment of the present invention, although the MOS transistor 122 is controlled by an open loop control, a feedback control may be used. For example, a current flows through the parasitic diode of the MOS transistor 122 may be detected by a current detecting means (e.g., a current sensor which detects a current flowing the parasitic diode, a voltage sensor which detects a voltage on both terminals of the MOS transistor 122 as a switching means or the like), and the zero voltage switching or the zero current switching may be performed in response to the detection signal.

Figure 19:
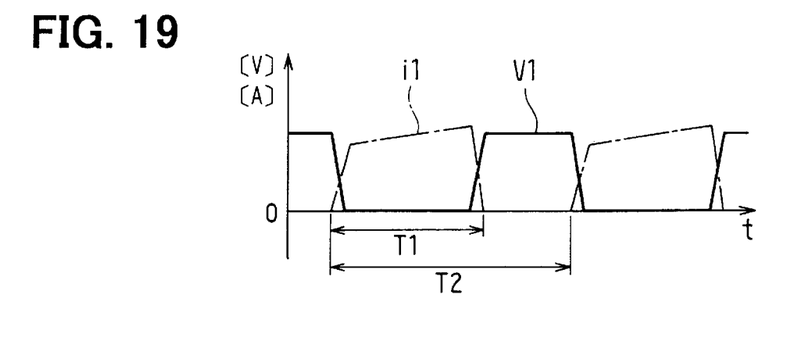
FIG. 19 is a time chart showing a voltage V1 and a current i1 indicated in FIG. 17.

Referring to FIGS. 17 through 20, a comparative embodiment will be explained. The same reference numbers indicates the same or similar components as the first embodiment. The comparative embodiment does not have a snubber circuit. Further, in the comparative embodiment, a control circuit 150 controls the MOS transistor 122 in a PWM manner. In the PWM control, a duty cycle T2 is constant and an on period T1 (a period of time for turning on the MOS transistor 122) is variable as shown in FIG. 19. FIG. 19 shows waveforms of a voltage V1 on the primary coil 121a and a current i1 on the primary coil 121a. Therefore, the current waveform and the voltage waveform cross at a certain values and overlap each other. Therefore, switching loss may be occurred.

Figure 17:
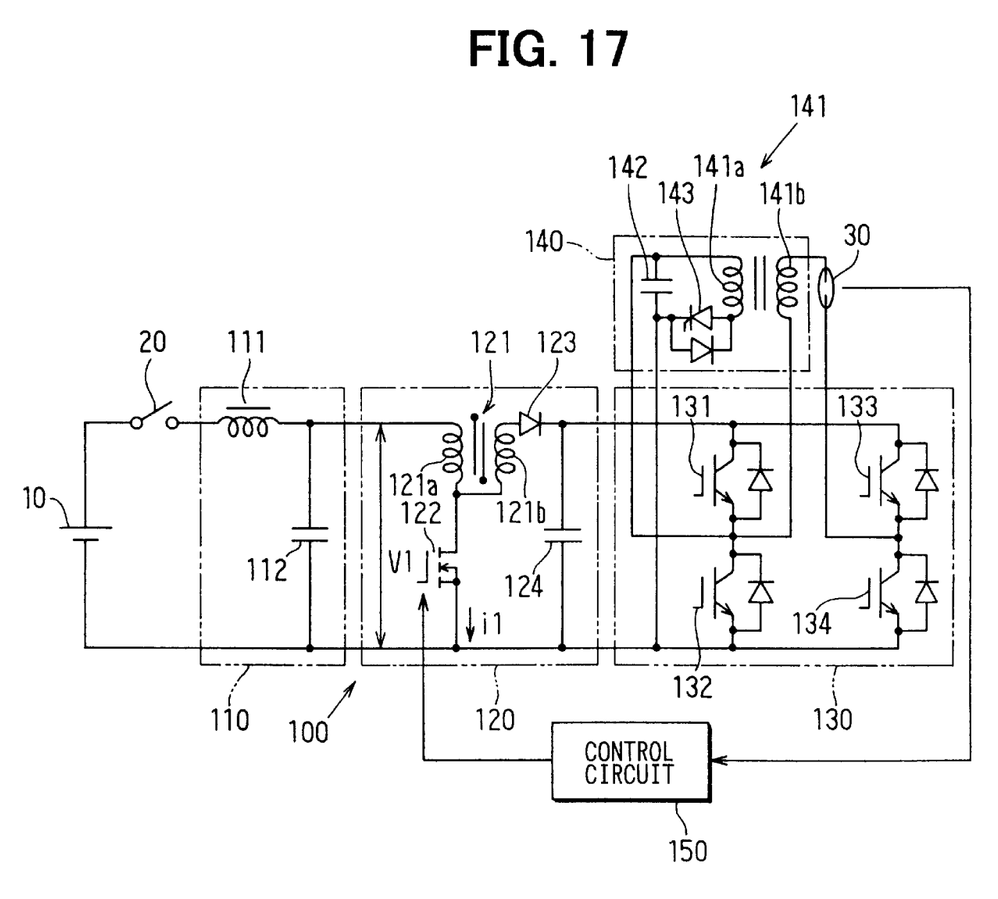
FIG. 17 is a schematic diagram of a discharge lamp ballast circuit according to a comparative embodiment.
Figure 18:
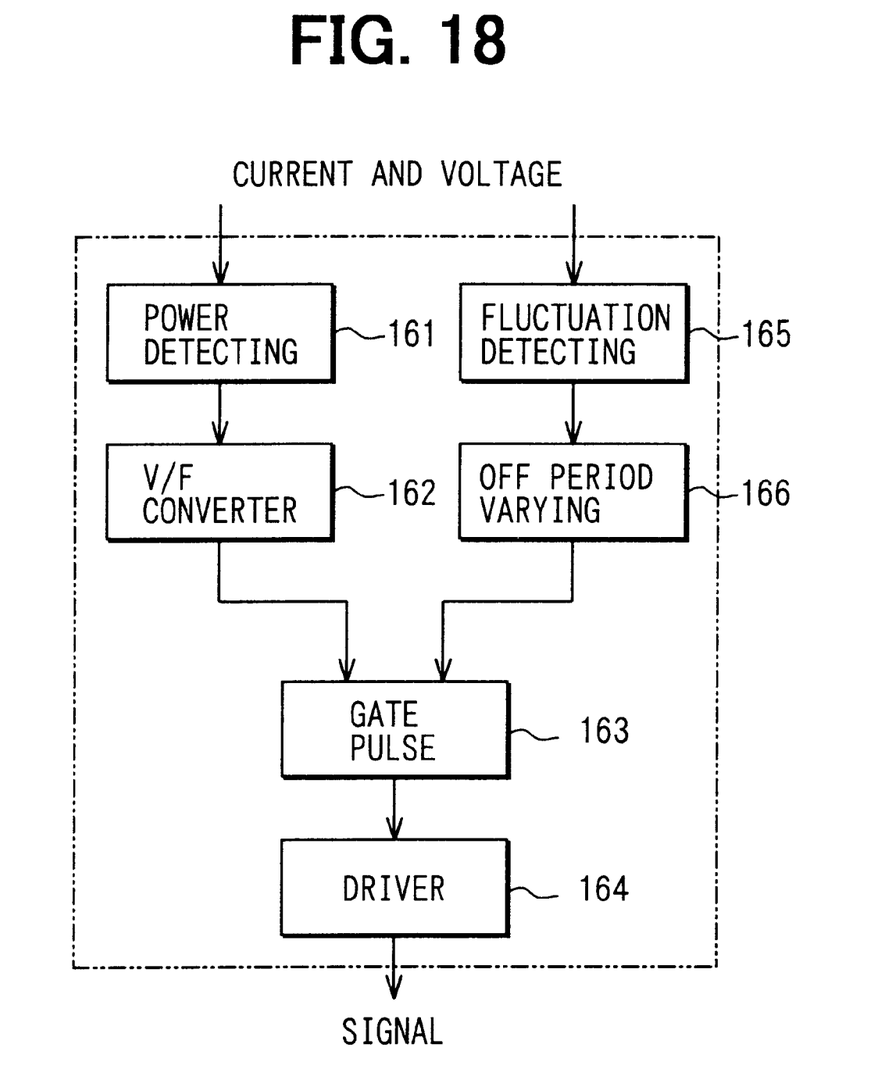
FIG. 18 is a schematic diagram of the control circuit according to the comparative embodiment.
Figure 20:
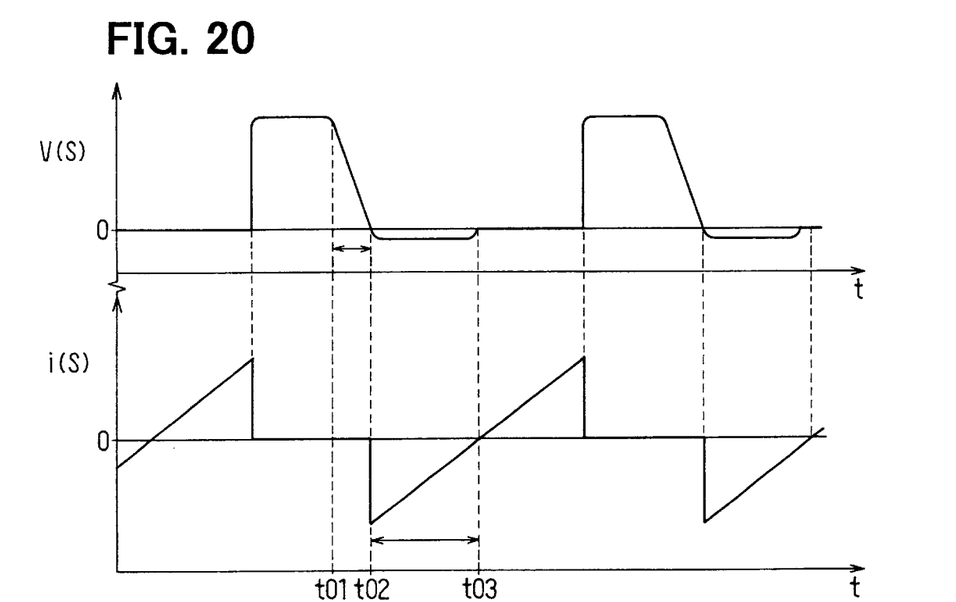
FIG. 20 is a time chart showing a voltage V(S) and a current i(S) according to the comparative embodiment.
Figure 21:
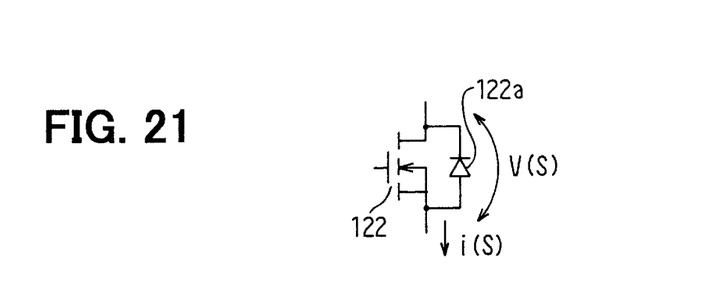
FIG. 21 is a schematic diagram showing a parasitic diode of a MOS transistor.

If a snubber circuit element disclosed in JP-A-9-84343 is combined to the arrangement shown in FIG. 17, a capacitor may be connected in parallel with the MOS transistor 122. When the MOS transistor 122 is controlled by the PWM manner, a terminal voltage V(S) and a current i(S) of the MOS transistor 122 are changed as shown in FIG. 20. A parasitic diode 122a of the MOS transistor 122 turns on to flow a current when the voltage V(S) is decreased below 0V by the resonance as shown in FIG. 21. At this time, if the control circuit 150 turns on the MOS transistor 122, it is possible to perform a zero voltage switching and to reduce a turn on loss. However, although it is possible to reduce the turn on loss and the turn off loss in case of the above described arrangement, loss may be still occurred due to a longer conducting period of the parasitic diode. The conducting period of the parasitic diode may be adjustable by tuning an inductance L of the primary coil 121a of the fly-back transformer 121. But, in order to provide an adequate operation of the discharge lamp ballast circuit, a range of an available inductance L of the primary coil 121a is limited. Therefore, in such the limited range, it is impossible to reduce loss caused by above-described conducting period of the diode below a desirable value.

The embodiments of the present invention are accomplished in consideration of the above-mentioned circumstances, and to address the drawbacks of the comparative embodiment.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A discharge lamp ballast circuit having a DC/DC converter circuit that has a switching device for switching a primary current on a fly-back transformer, comprising:
   a snubber circuit for the switching device;
   a capacitor connected in parallel with one of the switching device and the fly-back transformer for generating a resonance with a leakage reactor of the fly-back transformer; and
   a control circuit for driving the switching device in a PFM manner, for performing one of a non-zero voltage switching and a non-zero current switching during a lighting preparation period of the discharge lamp, and for performing one of a zero voltage switching and a zero current switching after the lighting preparation period,
   wherein the control circuit drives the switching device so that the switching device switches after the voltage on a primary coil of the fly-back transformer reaches a peak value for performing the non-zero voltage switching.

2. A discharge lamp ballast circuit having a DC/DC converter circuit that has a switching device for switching a primary current on a fly-back transformer, comprising:
   a snubber circuit for the switching device;
   a capacitor connected in parallel with one of the switching device and the fly-back transformer for generating a resonance with a leakage reactor of the fly-back transformer; and
   a control circuit for driving the switching device in a PFM manner, for performing one of a non-zero voltage switching and a non-zero current switching during a lighting preparation period of the discharge lamp, and for performing one of a zero voltage switching and a zero current switching after the lighting preparation period,
   wherein an inductance of the leakage reactor of the fly-back transformer and a capacitance of the capacitor are set so that a condition for enabling the zero voltage switching and for setting the switching frequency in the PFM control into the predetermined value is satisfied, and so that the inductance of the leakage reactor is minimized upon the condition being satisfied.

3. A discharge lamp ballast circuit having a DC/DC converter circuit that has a switching device for switching a primary current on a fly-back transformer, comprising:
   a snubber circuit for the switching device;
   a capacitor connected in parallel with one of the switching device and the fly-back transformer for generating a resonance with a leakage reactor of the fly-back transformer; and a control circuit for driving the switching device in a PFM manner, for performing one of a non-zero voltage switching and a non-zero current switching during a lighting preparation period of the discharge lamp, and for performing one of a zero voltage switching and a zero current switching after the lighting preparation period, wherein the control circuit drives the switching device by a switching frequency when performing the zero voltage switching, and drives the switching device by a higher switching frequency when performing the non-zero voltage switching in comparison with the switching frequency in the zero voltage switching, the higher switching frequency is obtained by shortening an off period of the switching device, and the off period is shortened by turning on the switching device after a voltage on a primary coil of the fly-back transformer reaches to a peak value and before the voltage on the primary coil reaches to zero or below zero.

4. A discharge lamp ballast circuit having a DC/DC converter circuit that has a switching device for switching a primary current on a fly-back transformer, comprising:

a snubber circuit for the switching device;

a capacitor connected in parallel with one of the switching device and the fly-back transformer for generating a resonance with a leakage reactor of the fly-back transformer; and a control circuit for driving the switching device in a PFM manner, for performing one of a non-zero voltage switching and anon-zero current switching during a lighting preparation period of the discharge lamp, and for performing one of a zero voltage switching and a zero current switching after the lighting preparation period, wherein the control circuit extends an off period of the switching device when an instantaneous lamp power drop is detected based on a signal corresponding to the lamp power to enable the zero voltage switching.

5. A discharge lamp ballast circuit having a DC/DC converter circuit that has a switching device for switching a primary current on a fly-back transformer, comprising:

a snubber circuit for the switching device;

a capacitor connected in parallel with one of the switching device and the fly-back transformer for generating a resonance with a leakage reactor of the fly-back transformer; and a control circuit for driving the switching device in a PFM manner, for performing one of a non-zero voltage switching and a non-zero current switching during a lighting preparation period of the discharge lamp, and for performing one of a zero voltage switching and a zero current switching after the lighting preparation period, a rectifier diode connected to the a secondary coil of the fly-back transformer, wherein the capacitor is connected between a connection point between the secondary coil and the diode and a ground of the circuit, and the control circuit performs the non-zero current switching and the zero current switching.

6. The discharge lamp ballast circuit according to claim 5, wherein the control circuit drives the switching device so that the switching device switches after the current on the primary coil reaches to a peak value for performing the non-zero current switching.

7. A discharge lamp ballast circuit having a DC/DC converter circuit that has a switching device for switching a primary current on a fly-back transformer, comprising:

a snubber circuit for the switching device;

a capacitor connected between a terminal of the switching device and a terminal of the fly-back transformer for generating a resonance with a leakage reactor of the fly-back transformer; and a control circuit for driving the switching device in a PFM manner, performing one of a non-zero voltage switching and a non-zero current switching during a lighting preparation period of the discharge lamp, and for performing one of a zero voltage switching and a zero current switching after the lighting preparation period, wherein the control circuit drives the switching device so that the switching device switches after the voltage on the primary coil reaches a peak value for performing the non-zero voltage switching.

8. The discharge lamp ballast circuit according to claim 1, wherein the control circuit comprises:

a power detecting circuit for detecting a lamp power based on signals corresponding to the lamp voltage and the lamp current;

a V/F converter circuit coupled to the power detecting circuit for converting the voltage indicative of the lamp power outputted from the power detecting circuit into a frequency signal;

a gate pulse generating circuit coupled to the V/F converter circuit for generating gate pulse applied to the gate of the switching device; and a driver circuit coupled to the gate pulse generating circuit for applying the gate pulse on the gate of the switching device.

9. The discharge lamp ballast circuit according to claim 8, wherein the control circuit further comprises:

a power fluctuation detecting circuit for detecting a fluctuation of the lamp power based on the lamp voltage and the lamp current;

an off period varying circuit coupled to the power fluctuation detecting circuit for outputting a signal for extending an off period of the switching device when the fluctuation of the lamp power is detected by the power fluctuation detecting circuit;

an off period shortening circuit for shortening the off period of the switching device during a lighting preparation period, wherein the off period shortening circuit has a timer circuit for inputting a signal from a lighting switch and for outputting a signal having a predetermined duration that is indicative of a lighting preparation period in response to the turning on of the lighting switch, a breakdown detecting circuit for inputting a signal corresponding to the lamp current and for detecting whether the lamp is lit based on the lamp current, and a lighting preparation period determining circuit coupled to the gate pulse generating circuit for detecting the lighting preparation period based on the signal outputted from one of the timer circuit and the lighting detecting circuit.

10. The discharge lamp ballast circuit according to claim 1, wherein the DC/DC converter circuit is for supplying about a 300–500V up-converted voltage.

11. The discharge lamp ballast circuit according to claim 1, wherein the control circuit is for supplying about 35–65 W of power.

* * * * *